United States Patent [19]
Sims

[11] B 3,983,434
[45] Sept. 28, 1976

[54] SEGMENTED STATOR CORE STRUCTURE AND METHOD FOR MAKING SAME

[75] Inventor: Marion W. Sims, South Whitley, Ind.

[73] Assignee: General Electric Company, Fort Wayne, Ind.

[22] Filed: Nov. 5, 1974

[21] Appl. No.: 521,046

[44] Published under the second Trial Voluntary Protest Program on February 24, 1976 as document No. B 521,046.

[52] U.S. Cl. ............................... 310/254; 310/216; 310/217
[51] Int. Cl.² ......................................... H02K 1/12
[58] Field of Search ........................... 310/216–218, 310/42, 254, 256, 258, 259

[56] References Cited
UNITED STATES PATENTS

| | | | |
|---|---|---|---|
| 794,998 | 7/1905 | Mott | 310/216 X |
| 1,255,606 | 2/1918 | Hensley | 310/216 X |
| 1,255,607 | 2/1918 | Hensley | 310/217 X |
| 1,946,468 | 2/1934 | Bindschedler | 310/216 X |
| 2,487,692 | 11/1949 | Brouwer | 310/216 |
| 2,503,092 | 4/1950 | Brouwer | 310/216 |
| 3,591,819 | 7/1961 | Laing | 310/217 |

*Primary Examiner*—Mark O. Budd
*Attorney, Agent, or Firm*—Joseph E. Papin

[57] ABSTRACT

A stator core structure, and method of making same, for a dynamoelectric machine formed of a first plurality of generally U-shaped segments each having a bight portion and leg portions. Each of the first segments is formed of a plurality of relatively thin laminations of flat strip ferro-magnetic material, the bight portion of each of the first segments having an opening formed therethrough intermediate its leg portions. The first segments are arranged with their bight portions lying generally on a first circle and with their leg portions extending radially inwardly, the leg portions of adjacent first segments being in adjacent, parallel relationship thereby mutually forming first spaced polar projections. At least a second plurality of generally U-shaped segments is provided equal in number to the first segments and each having a bight portion and leg portions, each of the second segments also being formed of a plurality of laminations of relatively thin flat strip ferro-magnetic material. Each of the second segments is arranged with its bight portion lying on a second circle coaxial with and larger than the first circle and spanning an adjacent two of the first segments, the leg portions of adjacent second segments being in adjacent, parallel relationship and extending radially inwardly through an opening in the bight portion of a respective one of the first segments thereby mutually forming second spaced polar projections respectively intermediate the first projections, the first and second projections having inner ends which define a cylindrical bore for receiving a rotor member.

16 Claims, 10 Drawing Figures

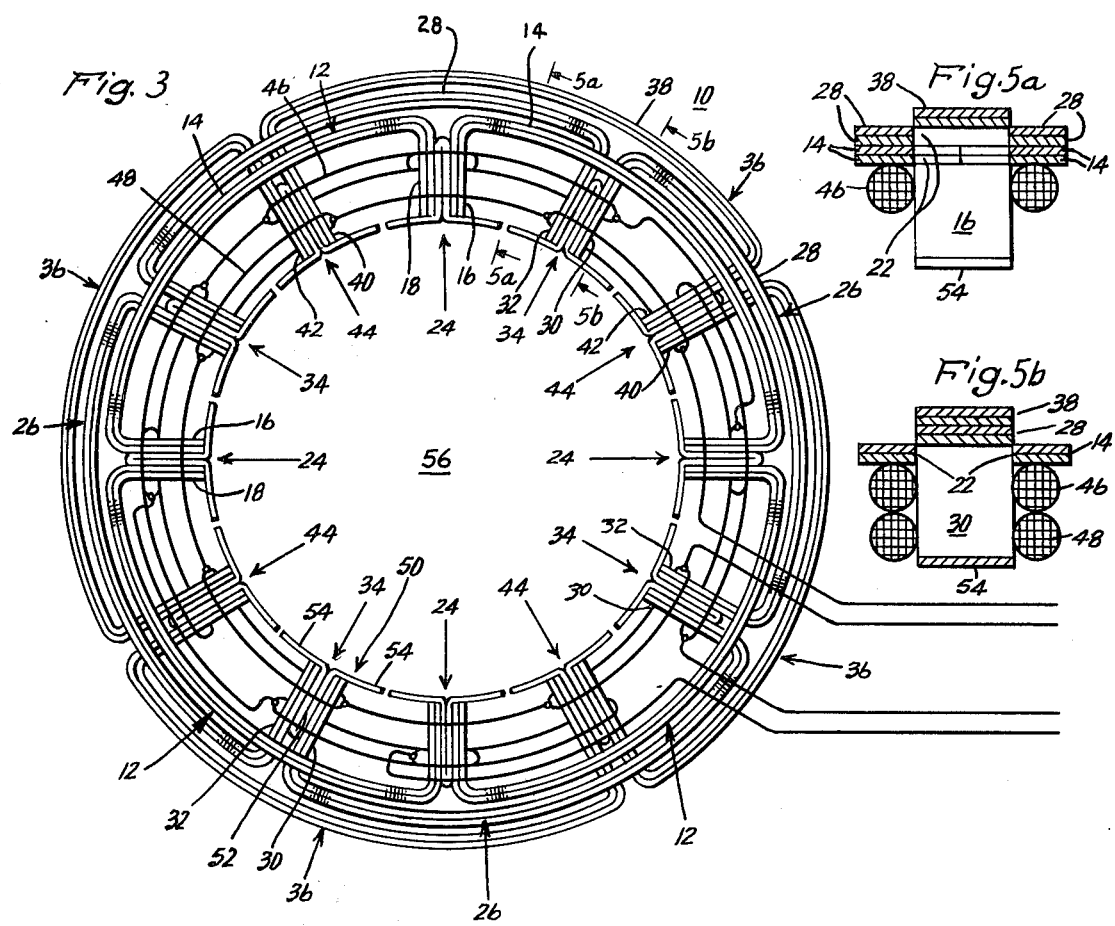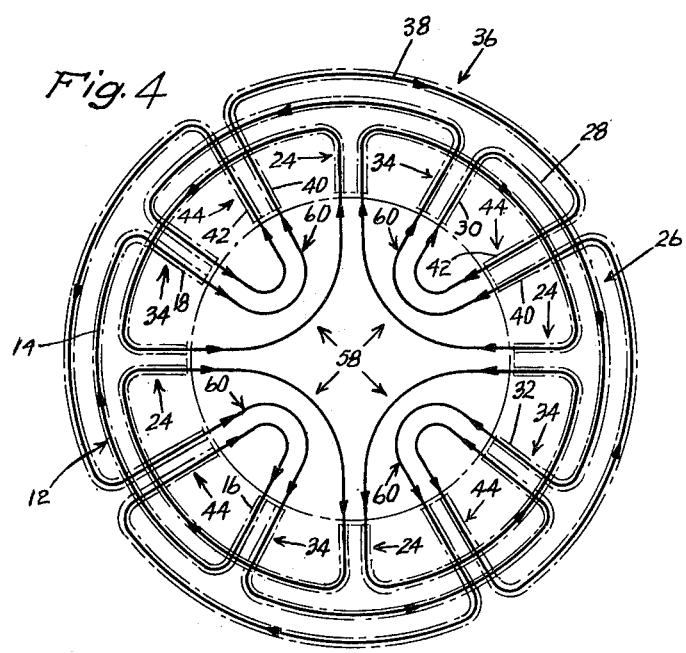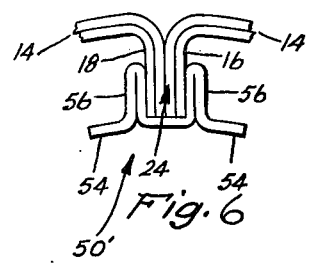

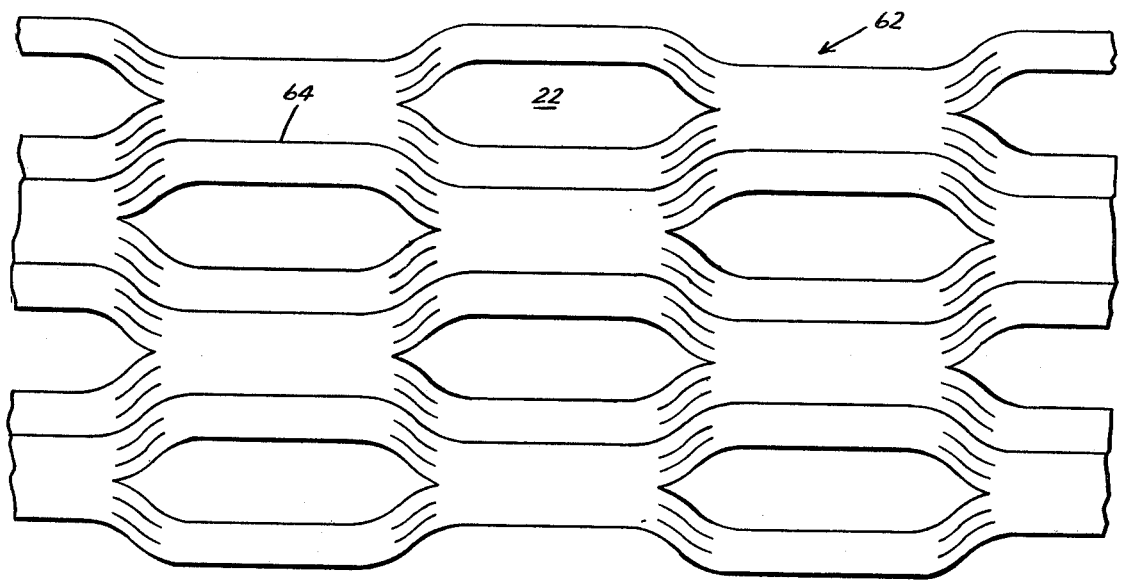
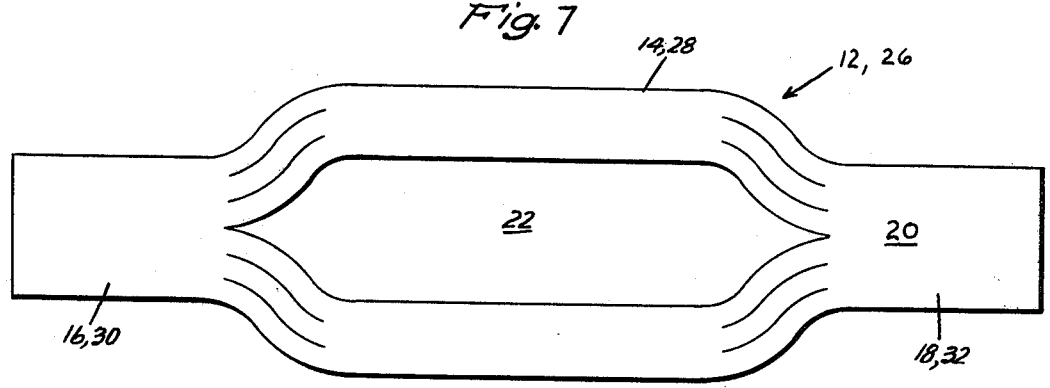
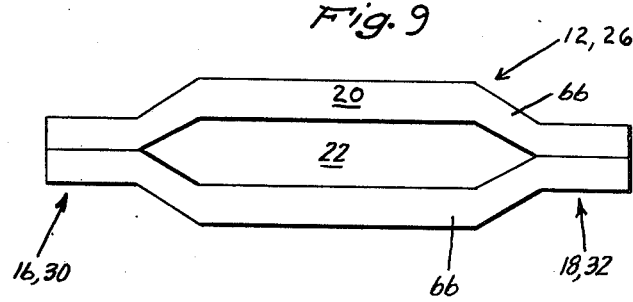

3,983,434

SEGMENTED STATOR CORE STRUCTURE AND METHOD FOR MAKING SAME

CROSS REFERENCE TO RELATED APPLICATIONS

A related application is Ser. No. 521,047 filed Nov. 5, 1974 by Allen A. Brammerlo and assigned to the assignee of the present application. Also my copending applications Ser. No. 521,045 and Ser. No. 521,044 both filed Nov. 5, 1974 are related applications and are assigned to the assignee of the present application. All of these related applications are incorporated herein by reference.

BACKGROUND OF THE INVENTION

This invention relates generally to dynamoelectric machines and more particularly to a stator core structure therefor.

In the past, a dynamoelectric machine was provided with a stator core structure conventionally formed of a stacked plurality of relatively thin laminations of sheet magnetic steel or the like, the structure having a central bore for receiving a rotor member. Such laminations were conventionally formed in a punch press operation from an elongate strip of magnetic steel, there being considerable scrap remaining as the result of punching the laminations from the elongate strip and punching winding slots in the laminations.

A salient two-pole dynamoelectric machine stator structure formed of flat strips of magnetic material is shown in the U.S. Pat. No. 2,764,802 assigned to the assignee of the present application. Dynamoelectric machine pole pieces formed of a folded flat strip of magnetic material have also been known which may be suitable for small D.C. motors, but would not be expected to have the efficiency required of larger machines.

It is accordingly an object of the invention to provide an improved dynamoelectric machine stator core structure.

Another object of the invention is to provide an improved, scrapless dynamoelectric machine stator core structure.

A further object of the invention is to provide an improved dynamoelectric machine including a stator core structure formed of flat strips of ferro-magnetic material.

SUMMARY OF THE INVENTION

In general and in one form of the invention, a stator core structure for a dynamoelectric machine has a plurality of ferro-magnetic segments each having a bight portion integrally formed between a pair of leg portions. A plurality of openings are respectively provided in the bight portions of some of the segments. The segments are arranged generally with adjacent leg portions of adjacent ones of the other of the segments respectively extending through the openings and with the bight portions of the some segments and the other segments extending generally concentrically to each other.

Further in general, a stator core structure in one form of the invention for a dynamoelectric machine is composed of ferro-magnetic strips, the strips being generally U-shaped and each having a bight portion and a pair of opposite leg portions. A plurality of the strips respectively have a leg portion accommodating opening through the bight portion thereof. The strips are arranged in a pattern with the plurality of the strips being innermost so as to accommodate adjacent leg portions of adjacent ones of the other strips in the bight portion openings, and the leg portions form teeth in the stator core structure wherein magnetic flux is directed thru an air gap and around the stator core structure in both directions along relative low reluctance paths. The flux flows from a first tooth to a second tooth following a bight portion connecting the first and second teeth.

Also in general, a stator core structure in one form of the invention for a dynamoelectric machine having more than two poles has a first and second plurality of generally U-shaped segments each having a bight portion and a pair of leg portions. Each of the segments is formed of at least one flat strip of ferro-magnetic material, and the segments in the first and second segment pluralities are arranged with their bight portions forming a perimeter with their leg portions extending therefrom. An opening is provided in the bight portion of the segments in the first segment plurality, and the leg portions of the segments in the second segment plurality pass through the openings in the bight portion of adjacent ones of the segments in the first segment plurality. The leg portions terminate in a bore defining configuration within the stator core structure.

More particularly but yet in general, a stator core structure in one form of the invention for a dynamoelectric machine has a first plurality of generally U-shaped segments each having a bight portion and leg portions. Each of the first segments is formed of at least one flat strip of ferro-magnetic material, and the bight portions of each of said first segments have an opening formed therethrough intermediate the leg portions. The first segments are arranged with the bight portions thereof lying generally on a first circle and with the leg portions thereof extending radially inwardly, and the leg portions of adjacent first segments are in adjacent, parallel relationship mutually to form first spaced polar projections. At least a second plurality of generally U-shaped segments are equal in number to the first segments and each having a bight portion and leg portions, and each of the second segments is formed of at least one flat strip of ferro-magnetic material. The second segments are arranged with their bight portions lying generally on a second circle larger than and coaxial with said first circle, and the leg portions of adjacent second segments are in adjacent, parallel relationship and extend radially inwardly through the opening in the bight portion of a respective one of the first segments thereby mutually to form second spaced polar projections respectively intermediate said first projections. The first and second projections have inner ends defining a cylindrical bore coaxial with the circles.

Further in general and in one form of the invention, a stator core structure for a dynamoelectric machine has a first plurality of generally U-shaped segments each having a bight portion and a pair of leg portions. Each of the first segments is formed of at least one flat strip of ferro-magnetic material, and the bight portions of each of said first segments has an opening formed therethrough intermediate its leg portions. The first segments are arranged with the bight portions thereof forming a first periphery and with the leg portions thereof extending radially, and the leg portions of adjacent first segments are in adjacent, parallel relationship mutually to form first teeth. At least a second plurality of generally U-shaped segments are equal in number to the first segments, and each has a bight portion and a pair of leg portions. Each of the second segments is formed of at least one flat strip of ferro-magnetic material, and the second segments are arranged with their bight portions forming generally a second periphery larger than and coaxial with said first periphery. The leg portions of adjacent second segments are in adjacent, parallel relationship and extend radially through the opening in the bight portion of respective one of said first segments thereby mutually to form second teeth respectively between the first teeth. The first and second teeth have inner ends terminating in a bore defining configuration within the stator core structure.

The above-mentioned and other features and objects of this invention and the manner of attaining them will become more apparent and the invention itself will be better understood by reference to the following description of an embodiment of the invention taken in conjunction with the accompanying drawings.

BRIEF DESCRIPTION OF THE DRAWINGS

FIG. 3 is an end, schematic view showing a preferred embodiment of the segmented, dynamoelectric machine stator core structure embodying the invention in the preferred form represented by FIG. 1;

FIG. 4 is a view schematically showing the magnetic flux paths provided by the stator core structure of FIG. 3;

FIG. 5a is a cross-sectional view of a preferred embodiment of the stator core structure of FIG. 3 taken generally along the line 5a–5a thereof;

FIG. 5b is a cross-sectional view of the preferred embodiment of the stator core structure shown in FIG. 3 taken generally along the line 5b–5b thereof;

FIG. 6 is a fragmentary view showing a modification of the stator core structure shown in FIG. 3;

FIG. 7 is a top view of one of the flat strips employed in the stator core structure of FIG. 3;

FIG. 8 is a top view showing one method of providing the strips shown in FIG. 7; and FIG. 9 is a top view of another form of flat strip which may be employed in the stator core structure of FIG. 3.

DESCRIPTION OF THE PREFERRED EMBODIMENT

Figure 2:
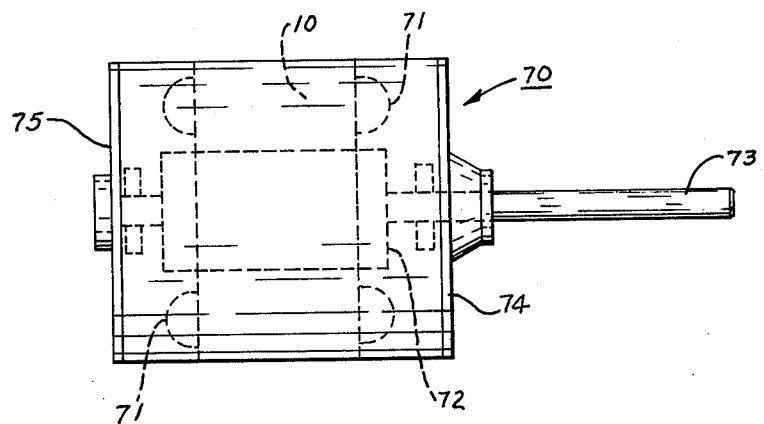
FIG. 2 is a perspective view of a dynamoelectric machine having a stator core structure that may be as illustrated in FIG. 1.

Referring first to FIG. 2, a dynamoelectric machine 70 is shown having an improved stator core 10 in one form of the invention with windings 71 mounted thereto. A rotor 72 has an axially extending shaft 73 supported by a pair of end shields 74 and 75. A detailed description of dynamoelectric machine 70 is not necessary since it is well known by those skilled in the art.

Referring now to FIG. 3, the improved, scrapless, segmented stator core structure of the invention, generally indicated at 10, comprises a first plurality (four in the illustrated embodiment) of generally U-shaped segments 12. Each of the segments 12 has a bight portion 14 and a pair of leg portions 16, 18 and is preferably formed of a plurality (two being shown in the illustrated embodiment) of relatively thin laminations of flat, strip ferro-magnetic material, such as magnetic steel or the like. Referring additionally to FIG. 7, each of the laminations, strips, or ribbons 20 forming a segment 12 has an opening 22 formed in its bight portion 14 intermediate its leg portions 16, 18.

Bight portions 14 of segments 12 are arranged generally on a circle with leg portions 16, 18 extending generally radially inwardly. Of course, it will be understood that segments 12 could be arranged in a pattern not necessarily circular and that in an inside-out type motor, leg portions 16, 18 would extend outwardly. Leg portions 16, 18 of adjacent segments 12 are in closely adjacent, parallel relationship thereby mutually forming a polar projection or tooth 24.

A second plurality of generally U-shaped segments 26 is provided equal in number to segments 12 and each having a bight portion 28 and a pair of leg portions 30, 32. Segments 26 are also preferably formed of a plurality of relatively thin laminations of flat, strip ferro-magnetic material. Each of the laminations 20 forming segment 26 also has opening 22 formed in its bight portion 28 intermediate its leg portions 30, 32. Bight portion 28 of each of segments 26 spans an adjacent two segments 12, and leg portions 30, 32 of an adjacent pair of segments 26 extends generally radially inwardly in closely adjacent, parallel relationship through openings 22 in bight portion 14 of a respective segment 12 thereby to form a plurality of polar projections or teeth 34 intermediate teeth 24.

A third plurality of generally U-shaped segments 36 is provided equal in number to segments 12 and 26 and each having a bight portion 38 and a pair of leg portions 40, 42. Each of the segments 36 is likewise preferably formed of a plurality of relatively thin laminations of flat, strip ferro-magnetic material. Bight portion 38 of each segment 36 spans an adjacent two segments 26, and leg portions 40, 42 of adjacent segments 38 extend radially inwardly in closely adjacent, parallel relationship through openings 22 in bight portions 28 of respective ones of segments 26 and openings 22 in bight portions 14 of respective ones of segments 12 thereby forming a plurality of polar projections or teeth 44 respectively intermediate teeth 24, 34.

Figure 1:
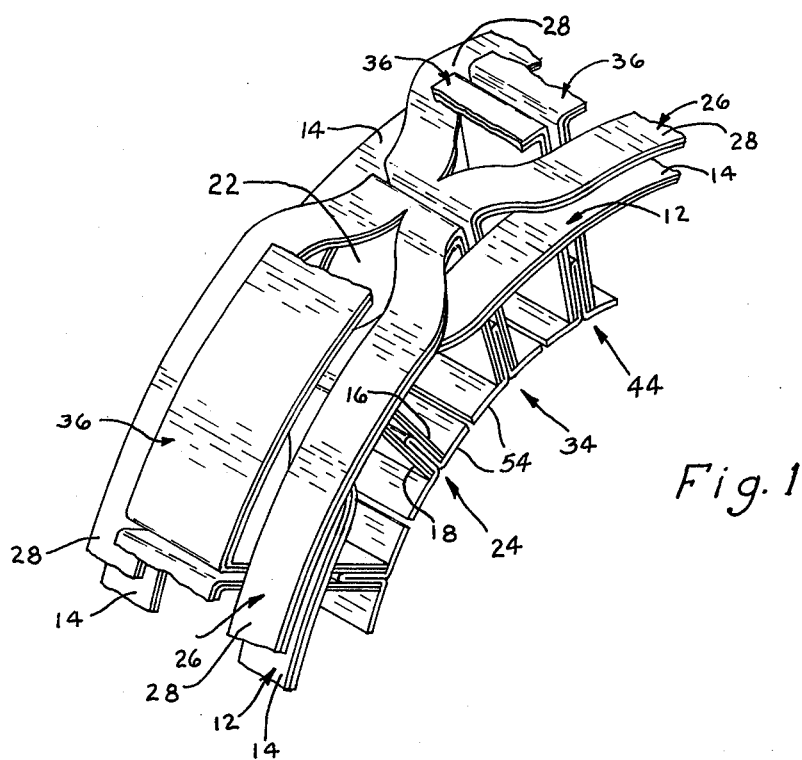
FIG. 1 is a perspective of a portion, with parts broken away, of the stator core, embodying features of the invention in one form.

FIG. 1 shows in greater detail the construction of U-shaped ferro-magnetic strips making up the stator core structure of FIG. 3. Two segments 12 form teeth 24. Legs of segments 26 fit through opening 22 of segment 12 to form teeth 34, and legs of segments 36 fit through openings 22 in segments 26 and 12 to form teeth 44. The teeth 24, 34, and 44 can be terminated with arcuate shoe portions 54.

Referring briefly to FIGS. 5a and 5b, in a preferred embodiment of the stator structure shown in FIG. 3, bight portions 38, 28 and 14 are arranged in abutting relationship.

Conventional main or running field windings 46 surround teeth 44, 24 and 34, and conventional starting field winding 48 surround teeth 34, 44, as shown in FIG. 3. The windings can be wound or inserted on an assembled stator core structure after the stator core has been bonded together. Another method would be to hold the windings in a fixture and insert the U-shaped strips into the coil windings and then bond the completed stator assembly.

Following winding or positioning of field windings 46, 48 on teeth 24, 34, 44, a plurality of pole shoe members 50 may be assembled on teeth 24, 34, 44. In the embodiment shown in FIG. 3, each of pole shoe members 50 comprises a flat strip of ferro-magnetic material having a folded center portion 52 positioned between adjacent leg portions of the respective segments, such as leg portions 30, 32 of segments 26 which mutually form teeth 34, and a plurality of arcuate shoe portions 54 respectively extending outwardly from center portion 52 and defining a bore 56 for receiving a rotor member (not shown).

Referring briefly to FIG. 6, alternatively, the leg portions of adjacent segments, such as leg portions 16 and 18 of segments 12, may be abutting or contiguous, and a shoe member 50', again formed of a flat strip of ferromagnetic material, may have a plurality of folded portions 56 embracing the respective tooth, such as tooth 24.

Referring briefly to FIG. 4, with the placement of main winding 46 on stator core structure 10 as shown in FIG. 3, main or running flux paths 58 and 60 are provided, as shown. The flux follows a path from one tooth to another through an air gap or else through a bight portion that interconnects the two teeth. Flux can flow clockwise and counterclockwise since a tooth is formed of at least two leg portions each from a separate segment.

It will be understood that a magnetic flux path may flow from one tooth through an air gap and rotor to another tooth and then through a bight portion to a corresponding tooth of the same bight portion. The flux may follow a path of low reluctance by flowing from tooth to tooth via a bight portion that connects both the teeth. In this manner, flux may flow in either direction, clockwise and counterclockwise, around a stator core structure 10 following a low reluctance path.

Referring now to FIGS. 7 and 8, the laminations comprising segments 12, 26 may be formed from a sheet 62 of magnetic steel expanded by conventional apparatus to form openings 22 (thus providing an expanded sheet similar to expanded metal grating), and sheet 62 may then be slit, as indicated at 64, to form the individual laminations 20, as shown in FIG. 7.

Referring now to FIG. 9, alternatively, laminations 20 which comprise segments 12, 26 may also be formed of a plurality of identical sections 66 punched, in nested fashion, from a strip of magnetic steel and assembled as shown, to provide openings 22.

It will be readily seen that openings 22 in bight portions 28 of segments 26 through which only teeth 44 extend need not be as long as openings 22 in bight portions 14 of segments 12 through which both teeth 34 and 44 extend. Likewise segment 36 need not have openings in its bight portion 38.

In one preferred method of practicing my invention, strips are formed from a sheet of magnetic material having openings formed in the strips by expanding metal dies. The strips are bent into generally U-shaped segments and arranged in a pattern so that the leg portions of the segments form a cylindrical bore for a rotor. The number of segments used is determined by the number of poles required. After the segments are arranged, they are bonded together. Windings are then placed on teeth formed by the leg portions. The windings may, for example, be bonded in place, held in place by pole shoe members, or maintained in fix relationship in any other suitable manner.

It will be seen that the invention provides an essentially scrapless stator structure and most of the material would work at full flux density. The individual laminations or strips can be punched or otherwise formed to take advantage of the superior magnetic properties of the with-grain direction. It will further be seen that through-bolt openings are provided at locations centered above the teeth. Further, while arranging the bight portions of the several segments in contiguous relationship is preferred, the bight portions may be spaced as shown in FIG. 1 thereby to provide improved ventilation and cooling.

While there have been described above the principles of this invention in connection with specific apparatus, it is to be clearly understood that this description is made only by way of example and not as a limitation to the scope of the invention.

What I claim as new and desire to secure by Letters Patent of the United States is:

1. A stator core structure for a dynamoelectric machine comprising a first plurality of generally U-shaped segments each having a bight portion and a pair of leg portions, each of said first segments being formed of at least one flat strip of ferro-magnetic material, the bight portions of each of said first segments having an opening formed therethrough intermediate its leg portions, said first segments being arranged with said bight portions thereof forming a first periphery and with said leg portions thereof extending radially, the leg portions of adjacent first segments being in adjacent, parallel relationship mutually to form first teeth, and at least a second plurality of generally U-shaped segments equal in number to said first segments and each having a bight portion and a pair of leg portions, each of said second segments being formed of at least one flat strip of ferro-magnetic material, said second segments being arranged with their bight portions forming generally a second periphery larger than and coaxial with said first periphery, the leg portions of adjacent second segments being in adjacent, parallel relationship and extending radially through a said opening in the bight portion of a respective one of said first segments thereby mutually to form second teeth respectively between said first teeth, said first and second teeth having inner ends terminating in a bore defining configuration within the stator core structure.

2. The structure of claim 1 wherein each of said first and second plurality of generally U-shaped segments is formed of at least two relatively thin laminations of flat strip ferro-magnetic material.

3. The structure of claim 1 wherein the bight portions of each of said second segments spans an adjacent two of said first segments and abuts the bight portions thereof.

4. The structure of claim 1 further comprising a pole shoe member attached to the inner ends of each of said first and second teeth.

5. The structure of claim 4 wherein each of said pole shoe members comprises a flat strip of ferro-magnetic material having a folded center portion positioned between adjacent leg portions of the respective teeth and having arcuate shoe portions respectively extending outwardly therefrom, said shoe portions defining said bore.

6. The structure of claim 4 wherein the leg portions of the respective teeth are contiguous, each of said pole shoe members comprising a flat strip of ferro-magnetic material having folded portions embracing the respective teeth and having arcuate shoe portions respectively extending outwardly therefrom, said shoe portions defining said bore.

7. The structure of claim 1 wherein the flat strip of each of said first segments is formed of expanded metal thereby providing said bight portion opening therein.

8. The structure of claim 1 wherein the flat strip of each of said first segments is formed of two sections side-by-side which are laterally spaced apart in said bight portions thereby forming said opening therein.

9. The structure of claim 1 wherein the bight portion of each of said second segments has an opening therethrough intermediate its leg portions, and further comprising a third plurality of generally U-shaped segments equal in number to said first and second segments and each having a bight portion and leg portions, each of said third segments being formed of at least one flat strip of ferro-magnetic material, said third segments being arranged with their bight portions forming generally a third periphery larger than and coaxial with said second periphery, the leg portions of adjacent third segments being in adjacent, parallel relationship and extending radially through said openings in the bight portions of respective ones of said first and second segments thereby mutually to form third teeth respectively between adjacent ones of said first and second teeth, said third teeth having inner ends also defining said bore.

10. The structure of claim 9 wherein each of said first, second and third plurality of generally U-shaped segments is formed of a plurality of relatively thin laminations of flat strip ferro-magnetic material, the bight portion of each of said second segments spanning an adjacent two of said first segments and being contiguous to the bight portions thereof, the bight portions of each of said third segments spanning an adjacent two of said second segments and being contiguous to the bight portions thereof, said first, second and third teeth being equally spaced around said bore.

11. A stator core structure for a dynamoelectric machine having more than two poles comprising a first and second plurality of generally U-shaped segments each having a bight portion and a pair of leg portions; each of said segments being formed of at least one flat strip of ferro-magnetic material; said segments in the first and second segment pluralities being arranged with their bight portions forming a perimeter with their leg portions extending therefrom; an opening in the bight portion of the segments in the first segment plurality, the leg portions of the segments in the second segment plurality passing through the openings in the bight portion of adjacent ones of the segments in the first segment plurality and terminating in a bore defining configuration within the stator core structure.

12. A stator core structure for a dynamoelectric machine composed of ferro-magnetic strips, the strips being generally U-shaped and each having a bight portion and a pair of opposite leg portions, a plurality of the strips respectively having a leg portion accommodating opening through the bight portion thereof, the strips being arranged in a pattern with the plurality of the strips being innermost so as to accommodate adjacent leg portions of adjacent ones of the other strips in the bight portion openings, the leg portions forming teeth in the stator core structure wherein magnetic flux is directed thru an air gap and around the stator core structure in both directions along relative low reluctance paths, the flux flowing from a first tooth to a second tooth following a bight portion connecting the first and second teeth.

13. A stator core structure for a dynamoelectric machine comprising a first plurality of generally U-shaped segments each having a bight portion and leg portions, each of said first segments being formed of at least one flat strip of ferro-magnetic material, the bight portions of each of said first segments having an opening formed therethrough intermediate its leg portions, said first segments being arranged with said bight portions thereof lying generally on a first circle and with said leg portions thereof extending radially inwardly, the leg portions of adjacent first segments being in adjacent, parallel relationship mutually to form first spaced polar projections, and at least a second plurality of generally U-shaped segments equal in number to said first segments and each having a bight portion and leg portions, each of said second segments being formed of at least one flat strip of ferro-magnetic material, said second segments being arranged with their bight portions lying generally on a second circle larger than and coaxial with said first circle, the leg portions of adjacent second segments being in adjacent, parallel relationship and extending radially inwardly through a said opening in the bight portion of a respective one of said first segments thereby mutually to form second spaced polar projections respectively intermediate said first projections, said first and second projections having inner ends defining a cylindrical bore coaxial with said circles.

14. A stator core structure for a dynamoelectric machine comprising a plurality of ferro-magnetic segments each having a bight portion integrally formed between a pair of leg portions, a plurality of openings respectively in the bight portions of some of the segments, and the segments being arranged generally with adjacent leg portions of adjacent ones of the other of the segments respectively extending through the openings and with the bight portions of the some segments and the other segments extending generally concentrically to each other.

15. A stator core structure as set forth in claim 14, further comprising a bore in the stator core structure, the adjacent leg portions of the some segments and those of the other segments having ends generally constituting the bore.

16. A stator core structure as set forth in claim 14, wherein the adjacent leg portions of the some segments and those of the other segments respectively constitute polar projections of the stator core structure.

* * * * *